United States Patent
Yokouchi et al.

(10) Patent No.: US 7,171,083 B2
(45) Date of Patent: Jan. 30, 2007

(54) ONE-BY-N OPTICAL SWITCH

(75) Inventors: Kishio Yokouchi, San Jose, CA (US);
Lidu Huang, Danville, CA (US);
Shigenori Aoki, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/771,562

(22) Filed: Feb. 4, 2004

(65) Prior Publication Data
US 2005/0169573 A1    Aug. 4, 2005

(51) Int. Cl.
*G02B 6/35* (2006.01)
*G02F 1/295* (2006.01)
(52) U.S. Cl. .............................. 385/41; 385/22; 385/9
(58) Field of Classification Search ............ 385/16–23, 385/41, 9
See application file for complete search history.

(56) References Cited

U.S. PATENT DOCUMENTS

| | | | |
|---|---|---|---|
| 5,802,223 A | 9/1998 | Nashimoto | |
| 6,611,635 B1 | 8/2003 | Yoshimura et al. | |
| 2003/0235362 A1* | 12/2003 | Sugama et al. | ............... 385/16 |

FOREIGN PATENT DOCUMENTS

| | | |
|---|---|---|
| EP | 1 237 040 A2 | 9/2002 |
| JP | 09-005797 | 1/1997 |
| JP | 2000-180904 | 6/2000 |
| JP | 2000-180905 | 6/2000 |
| JP | 2000-241836 | 9/2000 |
| JP | 2002-318398 | 10/2002 |

OTHER PUBLICATIONS

Technology Thesarus Corp—OSW Optical Switch Series, "OSW2600 2XN Optical Switch," (2 pgs.), www.ttcone.com.
Technology Thesarus Corp—OSW Optical Switch Series, OSW2700 1XN Optical Switch (2 pgs.), www.ttcone.com.
LIGHTech Fiberoptics, Inc., "1Xn Optical Switch —LT500," (2 pgs.) San Leandro, CA, www.lightech.net.

(Continued)

*Primary Examiner*—John D. Lee
*Assistant Examiner*—Jerry T Rahll
(74) *Attorney, Agent, or Firm*—Sheppard Mullin Richter & Hampton LLP (57) ABSTRACT

An all-optical one-by-N optical switch is provided that has fewer components, is easier to control and has fewer optical losses that prior art one-by-N optical switches. An optical switch of the present invention includes an active deflection element formed from an electro-optical material to deflect an optical input from a single input to a selected one of N outputs. In one embodiment of the present invention, a single active deflection element at the input deflects an optical signal across a waveguide that commonly connects the N outputs. The N optical outputs include passive optical elements that are aligned with the deflected optical signal to accept a signal and provide it to a selected optical output. The optical switch can either be monolithic, where the optical material are all electro-optical materials, or can be hybrid, having separately formed components, such as the common waveguide, adhered to the substrate on which the optical switch is formed.

16 Claims, 8 Drawing Sheets

OTHER PUBLICATIONS

NTT Electronics Corporation, "Photonic Network Innovation —1XN Optical Switch," (2 pgs.), Aug. 2001, Ibaraki, Japan.

Technology Thesarus Corp—OSW Optical Switch Series, "OSW2600 2XN Optical Switch," (2 pgs.), www.ttcone.com, Aug. 2001.

Technology Thesarus Corp—OSW Optical Switch Series, OSW2700 1XN Optical Switch (2 pgs.), www.ttcone.com, Aug. 2001.

LIGHTech Fiberoptics, Inc., "1Xn Optical Switch—LT500," (2 pgs.) San Leandro, CA, www.lightech.net, Oct. 2001.

* cited by examiner

ONE-BY-N OPTICAL SWITCH

FIELD OF THE INVENTION

This invention is related to optical switches for use in optical communications networks. In particular, the present invention is directed to 1×N optical switches and 1×N optical switching modules for optical networks having improved switching performance.

BACKGROUND OF THE INVENTION

The growth of optical networks for voice and data communication has created a demand for high data-rate information-transfer capabilities. To enable such transfer capabilities, dense wavelength division multiplexing (DWDM) technology has been developed which allows transfer of multiple wavelength light beams over a single optical fiber enabling data transfer rates up to 100 Gb/s. High-speed switching and routing devices are core elements of the optical networks and allow dynamic control of the data traveling over the optical network. High data-transmission rates impose significant demands on the functionality of the switching devices.

Optical switching devices are commonly used in networks to redirect signals. For example, an N-by-M optical switch accepts as many as N input signals at N input fibers and diverts the output, and thus switching signals, among M output fibers. A particularly useful optical switch is a one-by-N switch (or "1×N optical switch"), that accepts a single signal at an input fiber and switches the signal to one of N output fibers. One-by-N optical switches are used, for example, to reconfigure networks due to lost connections, and monitoring and provisioning to ensure high quality connections.

While the use of optical switches has the potential for making optical networks fast and reliable, it has proven difficult to produce cost effective and dependable optical switches. Many types of optical switches have been proposed, including different schemes for switching an optical input to a particular optical output. Optical switches include electrically-based optical switches and mechanically-based optical switches. Electrically-based optical switches convert signal-containing light (or "optical signals") into electrical signals, re-route the electrical signals, and then convert the electrical signals back into light signals. Mechanically-based optical switches direct light signals using movable mirrors. Both of these types of optical switches have problems that limit their usefulness. Electrically-based optical switches involve conversion steps that make these switches expensive and slow. Mechanically-based optical switches have additional problems that limit their use in high speed systems, including reliability problems due to the large number of small movable mirrors, and switching times that are limited by the physical movement of mirrors.

Another type of optical switch is and all-optical switch having no moving parts and not involving conversion of the light signal to another form for switching. In all-optical switches, light signals are directed within optical materials having optical properties that can be modified.

One type of all-optical switch has a plurality of inputs and a plurality of outputs separated by a common waveguide. See, for example, commonly assigned U.S. Pat. No. 6,504, 966 by Kato et al. (the "Kato patent"), and incorporated herein by reference. Switching is accomplished by the routing any one of the input light beams through the common waveguide to a desired output. Each switched signal is deflected at the input, to direct the input from an input fiber to the output, and at the output, to direct the output into an output fiber. While such devices provide for switching between a large number of inputs and outputs, the configuration results in optical losses that are greater than for other 1×N optical switches.

Another all-optical 1×N switch is assembled from multiple 1×2 all-optical switches to form a switch with a single input and a plurality of outputs, forming a 1×N switch from N−1, 1×2 optical switches. This type of optical switch has several problems. First, there is an insertion loss of the light signal with each pass through a light switch. Since the number of switches through which the light signal must pass increases with N, the loss also increases with N. Second, each of the N−1 switches has a given power requirement and has to be controlled in unison with the other switches. This type of switch thus presents electrical and control problems.

Therefore, it would be desirable to have a 1×N, all-optical switch for an optical communication system that overcomes the problems with prior optical switches and is faster, more reliable and less expensive to construct, and has lower insertion losses than current optical switches. It is also desirable for a switch to be rugged and compact.

SUMMARY OF THE INVENTION

The present invention provides 1×N optical switches and switching modules based on the deflection of light within an optical deflection device using the electro-optic, or EO, effect. These optical deflection devices are extremely fast, and can be used in optical switching modules to handle a large number of input and output channels, e.g., greater than several thousand channels. The optical deflection element of the present invention act as one or more optical deflecting elements, such as prisms, which may present planar or curved surfaces to the incident light, that have controllable deflection angles according to the voltage applied to the individual prisms. One embodiment of the present invention provides a 1×N optical switch having an optical deflection element at the input, a common waveguide for propagating deflected light, and N output channels each aligned to accept deflected light. An alternative embodiment of the present invention includes N, second optical deflection elements, one for each output channel. The switches of the present invention are capable of deflecting light over a greater angle and with fewer optical deflection elements that those of the prior art.

One aspect of the present invention provides an optical switch comprising a single optical input for accepting an optical signal and an active deflecting element responsive to a control system to deflect the optical signal in a selected one of a plurality of directions. The deflecting element comprises an electro-optical material and at least one pair of electrodes on opposite sides of the electro-optical material. The optical switch further comprises a common waveguide to accept an optical signal deflected into any one of the plurality of directions, and a plurality of optical outputs. Each of the plurality of optical outputs corresponds to one of the plurality of directions, and each of the plurality of optical outputs comprises passive optics to accept the optical signal deflected in one of the plurality of directions and propagated through the common waveguide. The deflection of the optical signal to the selected one of the plurality of directions provides switching of the optical signal to a corresponding one of the plurality of optical outputs. In one embodiment, the optical switch is a monolithic switch, where the material through which the optical path of the optical signal through the single optical input, the common waveguide, and the plurality of optical outputs comprises the electro-optical material of the active deflecting element. In another embodiment, the optical switch is a hybrid switch, where the material through which the optical path of the optical signal through the single optical input, the common waveguide, and the plurality of optical outputs differs from the electro-optical material of the active deflecting element.

Another aspect of the present invention provides an optical switch module to direct an optical signal from an input fiber to a selected one of a plurality of output fibers. The optical switch module includes a single optical input to accept the optical signal from the input fiber and optical elements to direct the optical signal to a selected one of the plurality of output fibers. The optical elements comprise a collimating element to collimate the optical signal, an active deflecting element to accept the collimated optical signal and deflect the optical signal responsive to a control system in one of a plurality of directions corresponding to the selected one of the plurality of outputs. The deflecting element comprises an electro-optical material and at least one pair of electrodes on opposite sides of the electro-optical material. The optical element further comprise a common waveguide having a waveguide input to accept the optical signal deflected by the active deflecting element and a waveguide output, and a focusing element at the plurality of optical outputs comprising passive optics which focus the optical signal from the common waveguide into the selected one of the plurality of output fibers. In one embodiment, the optical switch is a monolithic switch, where the material through which the optical path of the optical signal through the single optical input, the common waveguide, and the plurality of optical outputs comprises the electro-optical material of the active deflecting element. In another embodiment, the optical switch is a hybrid switch, where the material through which the optical path of the optical signal through the single optical input, the common waveguide, and the plurality of optical outputs differs from the electro-optical material of the active deflecting element.

These features, together with the various ancillary provisions and features which will become apparent to those skilled in the art from the following detailed description, are attained by the 1×N optical switching device of the present invention, preferred embodiments thereof being shown with reference to the accompanying drawings, by way of example only.

BRIEF DESCRIPTION OF DRAWINGS

The foregoing aspects and the attendant advantages of this invention will become more readily apparent by reference to the following detailed description when taken in conjunction with the accompanying drawings wherein.

Reference symbols are used in the Figures to indicate certain components, aspects or features shown therein, with reference symbols common to more than one Figure indicating like components, aspects or features shown therein.

DETAILED DESCRIPTION

In general, the present invention provides for an optical switch in which one optical signal is switched to a selected one of a plurality of optical outputs. The optical switch of the present invention is an "all-optical" switch, that is, one in which switching occurs by diverting or redirecting a light beam containing the optical signal without the use of moving parts and without converting the optical signal to another form for switching, such as an electrical signal. The optical switch of the present invention can be incorporated into a switching module having optical connectors to accept the light of the optical signals from and provide light to optical fibers, includes one or more light deflection elements that use an EO-induced refractive index change to deflect an optical to one of a plurality of outputs. The optical switch of the present invention permits the switching of optical signals without moving parts and without conversion of the optical signal to an electrical signal.

Figure 1:
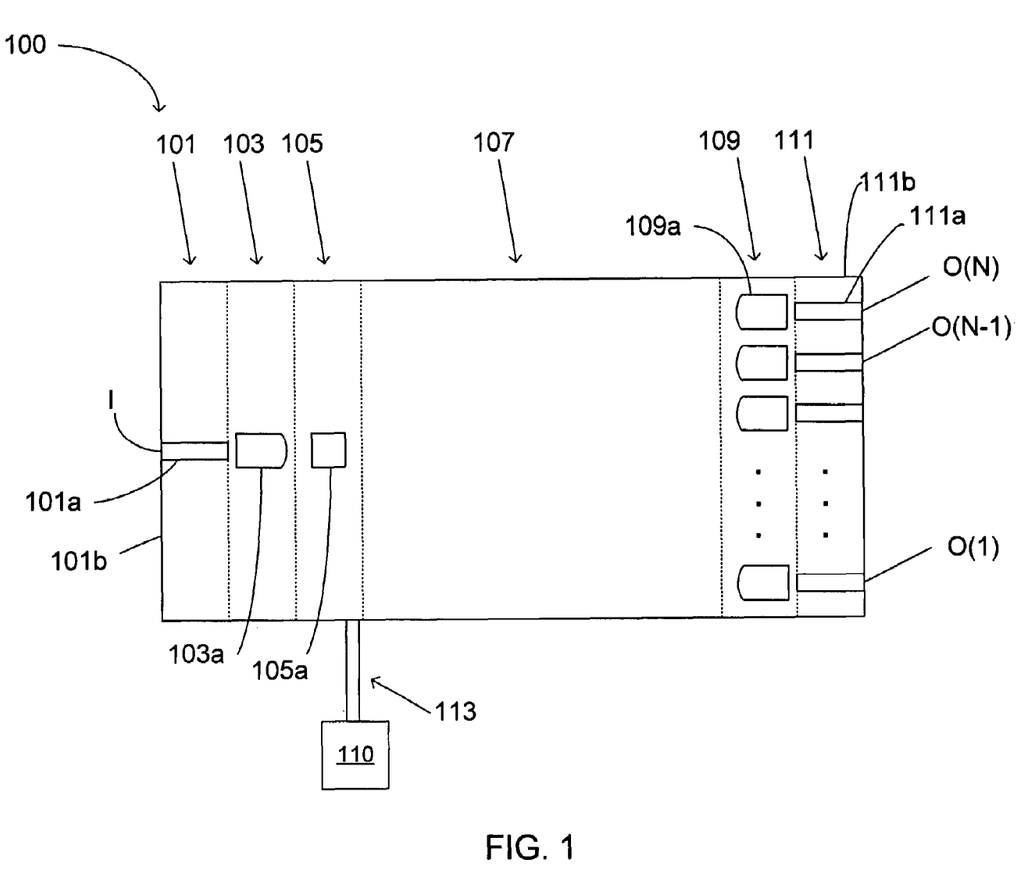
FIG. 1 is a schematic diagram showing a general embodiment of a 1×N optical switching module of the present invention.

Referring now to the drawings in combination with the description hereinafter presented, there is illustrated and described an optical switching apparatus that is particularly suited to fast, high density, compact switching of optical signals between I/O channels. FIG. 1 is a schematic diagram showing a general embodiment of a 1×N optical switching module 100 of the present invention. Module 100 has an input side waveguide portion 101, a collimate portion 103, an optical deflection portion 105, a common waveguide 107, a focus portion 109, and an output side waveguide portion 111. Input side waveguide portion 101 has one optical input I for accepting an optical signal, and output side waveguide portion 111 has N outputs, indicated as O(1), O(2), . . . , O(N) and individually as O(n), to which the optical signal provided to input I can be directed. Input side waveguide portion 101 is alternatively coupled to a single input fiber, and each output O(n) of side waveguide portion 111 is alternatively coupled to a corresponding one of N output fibers. Module 100 also includes a control system 110 that provides electrical signals over leads 113 for controlling optical deflections within the module as discussed subsequently.

In one embodiment, input side waveguide portion 101, collimate portion 103, optical deflection portion 105, common waveguide 107, focus portion 109, and output side waveguide portion 111 are formed integrally on a substrate (an "integral optical switch"). In an alternate embodiment, several of portions or waveguides 101, 103, 105, 107, 109, or 111 are formed integrally on a substrate, while the remaining portions are separately formed and thereafter coupled to the other portions (a "hybrid optical switch").

The input side waveguide portion 101 consists of an optical waveguide (core) 101a through which the optical signal provided to optical input I propagates, and a cladding layer 101b that covers the optical waveguide 101a to confine the signal in the optical waveguide 101a due to differences in the refractive index.

The collimate portion 103 includes a lens 103a that is optically coupled to waveguide 101a to receive an optical signal and collimate the light beam to reduce spreading of the beam as it propagates to focus portion 109. Lens 103a is preferably a two-dimensional lens that accepts light emerging from optical waveguide 101a as it spreads away from the waveguide and directs the light so that it emerges from the lens in a substantially collimated beam.

Optical deflecting portion 105 is slightly removed from lens 103a and includes an optical deflecting element 105a that receives the beam from lens 103a. Preferably, optical deflecting element 105a controllably changes the propagation direction of light passing therethrough by utilizing an electro-optical effect, such as the Pockels effect. Optical deflecting portion 105 includes electrical leads 113 for controlling optical deflecting element 105a. A detailed explanation of optical deflecting portion 105 is presented subsequently.

The common optical waveguide 107 consists of a slab waveguide to transmit the light from optical deflecting portion 105 to focus portion 109. In particular, optical waveguide 107 allows for optical communication between the input of module 100 and any one of the outputs according to the deflection of light in optical deflecting portion 105.

Focus portion 109 and output side waveguide portion 111 have components corresponding to each of the N outputs. Specifically, focus portion 109 includes N lenses 109a, and output side waveguide portion 111 includes N corresponding waveguides 111a that each provide output to one of the N outputs O(n). Common waveguide 107 provides optical communication from optical deflecting element 105 to any one of lenses 109a. Each lens 109a is preferably a two-dimensional lens similar to lens 103a, that can accept light collimated by lens 103a and diverted by optical deflecting portion 105 focuses the light into a corresponding waveguide 111a.

Module 100 includes active and passive optical elements. Thus, for example, the waveguides and lenses discussed previously are passive in that there is no active change in their configurations or optical properties for the purposes of modifying a light beam passing through them. The optical deflecting elements of the present invention, for example optical deflecting element 105a, are active elements that deflect an optical beam according to a signal applied to the element. For example, optical deflecting element 105a can be formed from EO materials that can be controllably activated to deflect light beams, by the modification of the refractive index of the EO material. The use of EO materials for optical switches is known and is described, for example, in the Kato patent. Desired properties of EO material include high EO coefficient, low optical loss, and thermal and mechanical stability. One preferred EO material is an organic material, including EO polymers, such as a mixture of polymethylmethacrylate (PMMA) and a chromophore. EO polymers are disclosed in U.S. Pat. No. 5,444,811 to Yoshimura, et al. (the "Yoshimura patent"), assigned to the assignee of the present application and incorporated herein by reference. EO material may also comprise multiple quantum well devices and quantum dots made from exemplary III–V compounds, such as $Al_xGa_{1-y}As/Al_yGa_{1-y}As$. Alternative EO materials include $LiNbO_3$ (lithium niobate, hereinafter termed as "LN") with a transition metal (e.g., Ti) in-diffused, $PbZr_xTi_yO_3$ (lead zirconate titanate), hereinafter termed as "PZT," or lanthanum-modified PZT, hereinafter termed as "PLZT" may be used.

The portions of optical switch module 100 that are not part of optical deflecting element 105a, such as portions or waveguides 101, 103, 107, 109, or 111, are formed from any combination of EO materials or from a material that is optically transparent. Examples of preferred optically transparent materials include, but are not limited to, highly transparent, highly heat resistant polymer such as a fluorinated polyimide, or from quartz or glass. An organic and/or inorganic hybrid may also be used. The formation of all transparent components from the same EO material has the advantage of ease of manufacturing, while the formation of the components from different materials allows for a wider range of materials that has advantages in tailoring the optical properties of the waveguides.

Suitable methods for forming films of polymer systems include spin coating, dip coating, spray coating, or vapor phase growth processes such as evaporation polymerization or CVD. For glass systems, sputtering, evaporation, CVD or the like may be employed, and when a sol gel method is used, spin coating, dip coating or spray coating may be employed. Light waveguides may be also formed by depositions of a lower cladding layer, a core layer, and a top-cladding layer, where the refractive index (RI) of the core layer is set to higher than the RI of the cladding layers.

Optical waveguides of the present invention are formed, as is know in the art, from optically transparent materials of a "sandwich" construction, where a material of one refractive index, forming a waveguide core, is surrounded by materials of a different refractive index, forming a waveguide cladding. The selection of materials having properties suitable for use in optical switches of the present invention is described, for example, in the Kato and Yoshimura patents. The preferred thickness and refractive indices of the cores and cladding of the present invention are determined by the wavelength of the propagated light according to techniques that are well known in the field. It is preferred that the refractive index of the optical materials is in the range of from about 1.5 to about 1.6, with the core having a lower or higher refractive index than the cladding. In one embodiment of the present invention, the core has a higher refractive index than the cladding, for example, with the core having a refractive index of about 1.52 and the cladding having a refractive index of about 1.50. The refractive index of the core formed by the electro-optical material varies according to the electro-optic constant and applied potential gradient to the material, and can vary, for example, by up to plus or minus 0.034 or more, as described in the Kato patent.

Figure 2:
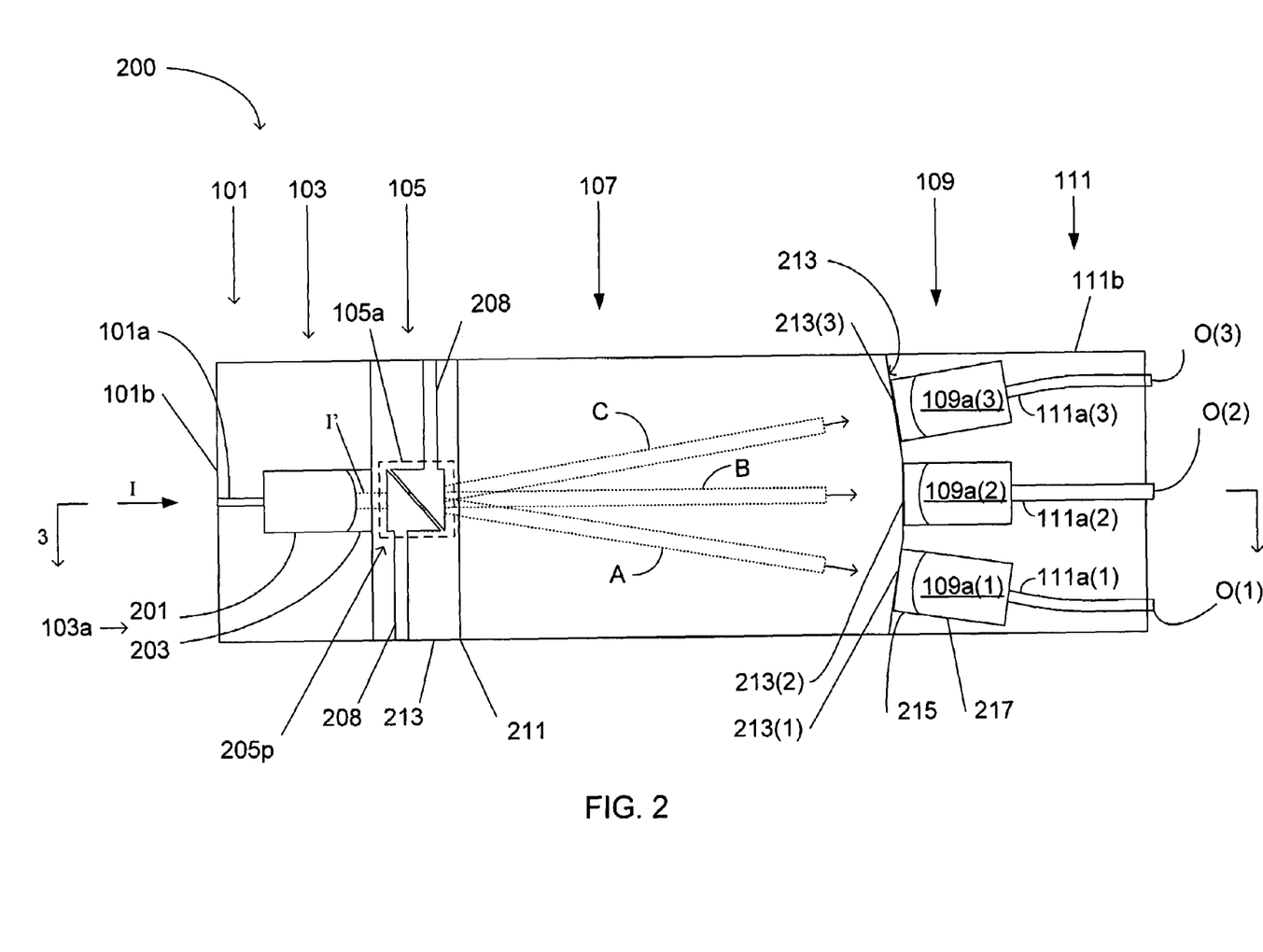
FIG. 2 is a schematic top view of a first embodiment of a 1×N optical switching module of the present invention.
Figure 3:
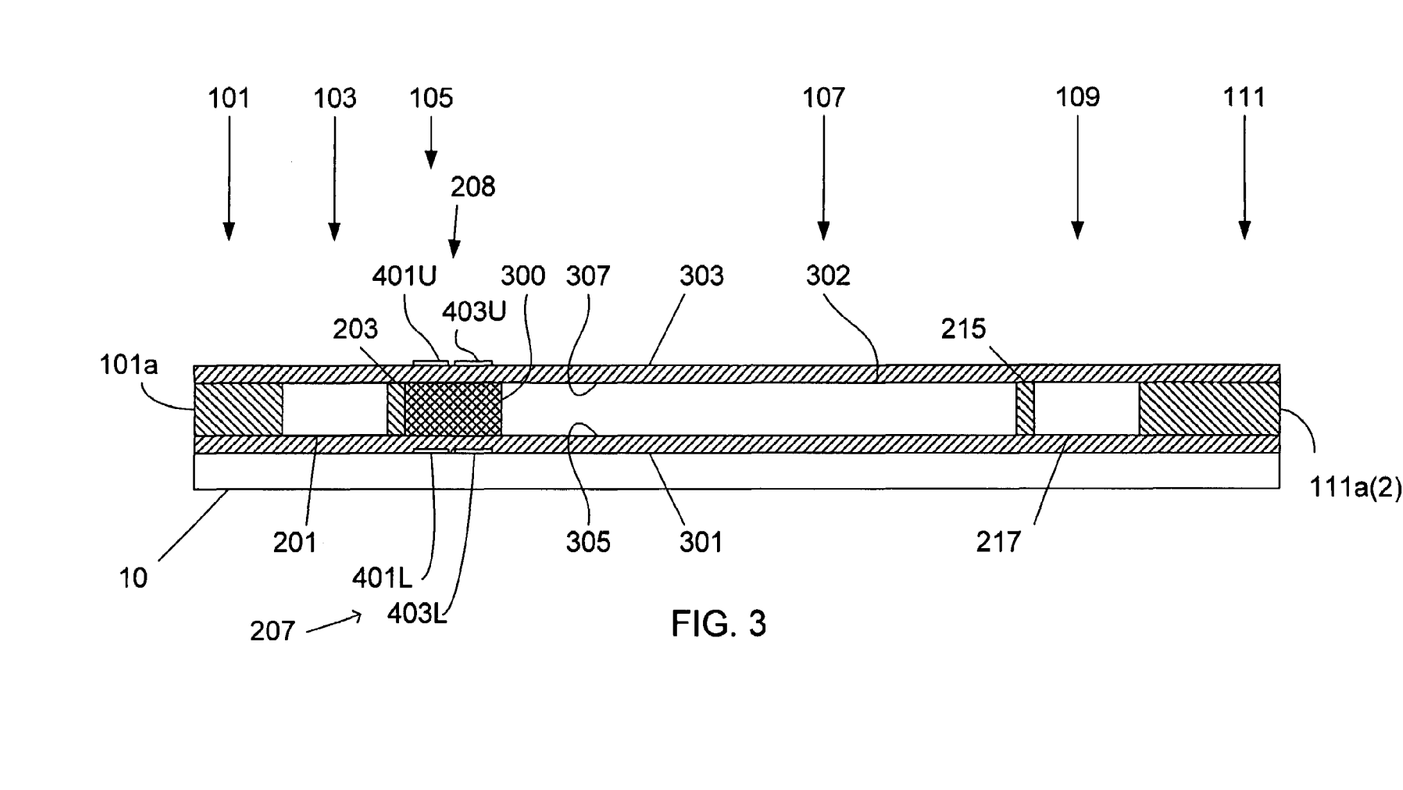
FIG. 3 is side view 3—3 of FIG. 2.

Several embodiment of the present invention will now be presented, several of which have specific numbers of outputs. The present invention is thus not limited by the embodiments presented herein, and can be generalized to any number of outputs. Preferably, the number of outputs is greater than 2. It will be appreciated that the maximum number of outputs will be limited by fabrication techniques, available space, production yield, and similar factors. FIGS. 2 and 3 show a first embodiment 1×N optical switch module of the present invention, as a 1×3 optical switch module 200 (that is, N=3) where FIG. 2 is a top view and FIG. 3 is view 3—3 of FIG. 2. Optical switch module 200 is an integral optical switch formed or assembled on a substrate 10 which is a silicon substrate, or another suitable substrate, e.g., glass plate, printed circuit board, etc., as required for production of the optical switch module. Each element 101, 103, 105, 107, 109, 111 includes a central portion that forms a waveguide core, a lower cladding layer 301 on substrate 10, and an upper cladding layer 303. Specifically, lower cladding layer 301 has a surface 305 and upper cladding layer 303 has a surface 307 that border the portions of module 200 that transmit light, and the refractive index of elements 101, 103, 105, 107, 109, 111 differ from the refractive index of cladding layers 301 and 303 such that light is confined to the volume between surfaces 305 and 307.

Figure 4:
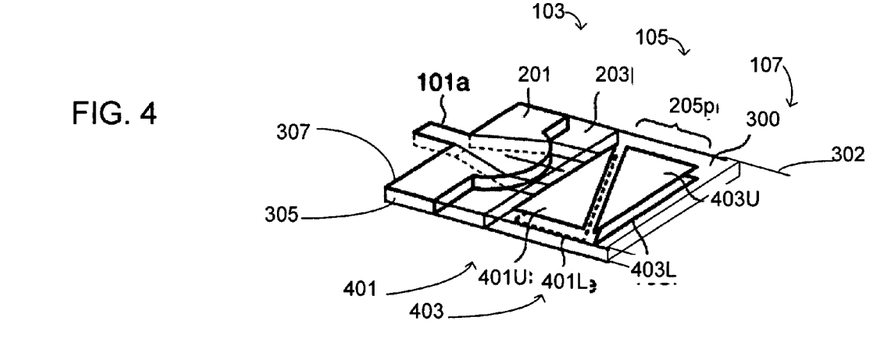
FIG. 4 as a perspective view showing input side waveguide portion, collimate portion, optical deflecting portion, and optical waveguide of the first embodiment of the present invention.

Details of optical switch module 200 will be explained with reference to FIGS. 2 and 3, and with reference to FIG. 4, which is a perspective view of the portions of input side waveguide portion 101, collimate portion 103, optical deflecting portion 105, and optical waveguide 107 that are between surfaces 305 and 307.

Input side waveguide portion 101 consists of optical waveguide (core) 101a through which the optical signal provided to input I propagates, cladding layer 101b, and cladding layers 301 and 303. Similarly, output side waveguide portion 111 consists of optical waveguide (core) 111a through which the optical signal provided to input I and deflected towards the output propagates, cladding layer 111b, and cladding layers 301 and 303.

Collimate portion 103 includes one or more lens 103a positioned relative to waveguide 101a to collimate the optical signal accepted at optical input I as a collimated beam I'. It is preferred that lens 103a is a two-dimensional lens and that the direction of propagation of light through waveguide 101a is the same as the direction of propagation of light emerging from collimate portion 103. Lens 103a comprises two, two-dimensional elements 201 and 203 having different refractive indexes. Portion 201 has a high refractive index, is curved to form a convex lens portion, and is formed by the same material as the optical waveguides (core) 101a. Portion 203 has a lower refractive index than portion 201 and is shaped and positioned to collimate light by the difference in the refractive index between the portions 201 and 203. Portion 203 is preferably a solid material, but is alternatively a gas or liquid. Alternatively, other optical arrangements for collimating light are within the scope of the present invention, including single lenses or other lens combinations.

Optical deflecting portion 105 includes an optical deflecting element 105a formed from a slab waveguide 300 with cladding layers 301 and 302 and lower electrodes 207 and upper electrodes 208 attached to electrical leads 113. In particular, lower electrodes 207 are positioned on the bottom of waveguide 300 formed by the material that exhibits the electro-optic effect, and oppose electrodes 208 on the top of waveguide 300, with matching shapes that define one prism pairs 205p. As shown in FIGS. 3 and 4, lower electrodes 207 have two portions, a first lower electrode portion 401L and a second lower electrode portion 403L, on the bottom of prism pair 205p, and upper electrodes 208 have two opposing portions, a first upper electrode portion 401U a second upper electrode portion 403U, on the top of prism pair 205p. The portion of waveguide 300 between lower and upper electrode portions 401L and 401U forms a first prism 401, and the waveguide portion between upper and lower electrode portions 403L and 403U forms a second prism 403. Electrodes 401U, 401L, 403U, and 403L are preferably triangular-shaped, forming prisms 401 and 403 that are positioned to have closely spaced and mutually opposing sides. In an alternative embodiment, electrodes 401U, 401L, 403U, and 403L have curved shapes, providing focusing, as described in commonly owned U.S. patent application Ser. No. 10/131,919, filed Apr. 24, 2002, incorporated herein by reference.

According to an aspect of the present invention, the pairs of upper and lower electrodes (401L, 401U and 403L, 403U) are spaced slightly apart from each other along on the waveguide to allow the application of different voltages to the different electrodes, as is subsequently described. The materials of electrodes 207 and 208 may be either a bulk or thin film material and the electrodes forming the switching elements may be made to define various shapes, such as prisms, gratings, various combinations and arrays of prisms and gratings, etc. Thus, in alternative embodiments, electrode shapes other than right triangles may be used, including other types of triangles, or other polygons. In addition, the sides of the electrodes can be curved to produce focusing or variable bending of light rays passing therethrough.

A controllable source of electrical potential (not shown) is coupled to electrodes 207 through electrical leads 113 from control system 110 to activate the electro-optic material. Suitable controllable sources for applying electrical potentials to the electrodes are well known to those skilled in the art and need not be described in further detail. When a voltage difference, $\Delta V$, is applied across electrodes 207 and 208, an electric field is established between the electrodes, extending through the thickness of waveguide 300 (into the plane of FIG. 2). Predominantly due to the electro-optic coefficient and thickness of waveguide 300 and the applied voltage difference, the refractive index of waveguide 300 is modified from a value of $n_o$ at zero applied voltage difference, to a value of $n_o \pm \Delta n$ within the prismatic volume defined by the electrodes. The corresponding electrode edges of energized deflection elements are approximately step changes in the refractive index to light passing through the waveguide. As a result of the application of voltage differences to electrodes across deflection elements 105a, a refractive index changes are established that deflect the light accordingly.

Figure 5:
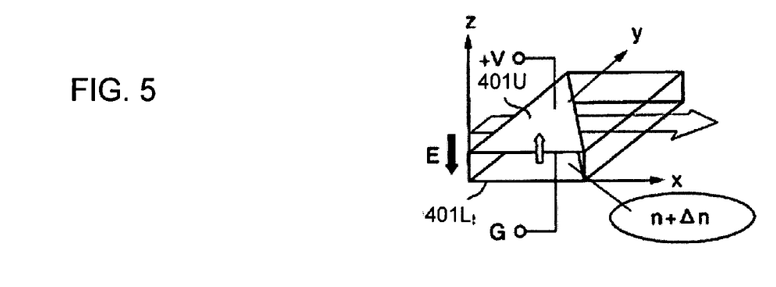
FIGS. 5 and 6 are schematic perspective views showing the deflection of light by the optical deflecting portion.
Figure 6:
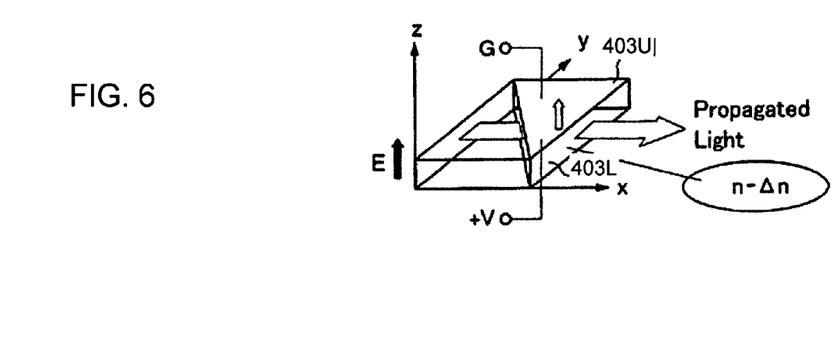

FIGS. 5 and 6 are schematic perspective views showing the deflection of light by optical deflecting portion 105. In FIGS. 5 and 6, an unfilled arrow indicates the direction of the crystal axis of the slab waveguide 300, and a filled arrow E indicates the direction of the electric field. As shown in FIG. 5, if first lower electrode portion 401L is connected to the ground line (G) and the control voltage (+V) is applied to first upper electrode portion 401U, the refractive index of the slab waveguide 300 between the first upper and lower electrode portions 401L and 401U changes from n to n+$\Delta$n. A change $\Delta$n of the refractive index of the electro-optic material by the Pockels effect is given by $\Delta n = -rn^3 E/2$, where r is the electro-optic constant of waveguide 300, n is the refractive index of waveguide 300, and E is the electric field strength induced by the voltages applied to the electrodes of prisms 401 and 403. The change in refractive index and the shape of prisms 401 and 403 deflects the propagation direction of the light signal toward the left direction by an angle $\theta$. In contrast, as shown in FIG. 6, if the second upper electrode portion 403U is connected to the ground line (G) and the control voltage (+V) is applied to second lower electrode portion 403L, the refractive index of the slab waveguide 300 between second lower and upper electrode portions 403L and 403U changes from n to n−$\Delta$n. Thus, the propagation direction of the light signal is further deflected toward the left direction only by an angle $\theta$. The electrodes to which the control voltage is applied (the first upper electrode and the second lower electrode) are also referred to as the control electrode hereinafter. Thus, in the first embodiment, the light can be deflected by 2$\theta$ by using one prism pair. The serial arrangement of multiple prism pairs (such as m prism pairs) deflects m×2$\theta$.

With reference again to FIGS. 2 and 3, optical deflection portion 105 accepts beam I' and directs it towards one of the outputs O(1), O(2), O(3) as indicated by the direction of beams A, B, and C, respectively. Specifically, beam I' can be directed to beam A or C according to the voltage applied to electrodes 207, or to beam B if no voltage is applied to the electrodes. Optical waveguide 107 extends from an input face 211 adjacent to optical deflecting portion 105 to an output face 213 adjacent to focusing portion 109, and includes a core layer 302 and cladding layers 301 and 303. Face 213 is preferably everywhere perpendicular to light passing through module 200. Thus face 213 includes face 213(1), 213(2), and 213(3) that are perpendicular to the direction of propagation of beams A, B, and C, respectively.

Focus portion 109 is optically similar to collimate portion 103, and includes N=3 lenses 109a, indicated as lens 109a(1), 109a(2), and 109a(3), which accept collimated beam I' and focuses the light onto waveguide 111a. Lens 109a comprises two, two-dimensional elements 215 and 217. Elements 215 and 217 are optically reversed from elements 203 and 201 of collimate portion 103, and act to focus light passing through focus portion 109. Specifically, portion 217 has a higher refractive index than does portion 215, and is formed of the same material as waveguides 111a. Alternatively, other optical arrangements for collimating light are within the scope of the present invention, including single lenses or other lens combinations. Each lens 109a can accept light deflected towards an adjacent portion of face 213 and is focused onto output waveguide portion 111, as was also discussed previously. Lenses 109a are preferably angled to accept beams A, B, and C along the optical axis of the lenses, and are thus angled relative to one another. The individual waveguides 111a of waveguide portion 111 are angled to accept light from a corresponding lens 109a and produce an array of outputs O(n) that are parallel.

Optical input I thus accepts an optical signal I into core 101a, and elements 201, 203 collimate optical signal I and produces a collimated light beam I'. Deflecting portion 105 then redirects the direction of propagation of the light signal to one of the 3 outputs, which propagate through waveguide 107 as one of the beams A, B, or C according to the deflection imparted in deflecting portion 105. Because each of beams A, B, and C has a well-defined propagation direction, the optics further downstream focusing portion 109 can be oriented and placed in a fixed location such that the light can be collected without further use of deflecting elements. In particular, face 213, lens 109a, and waveguide 111a are aligned to the beams and provide them to output O(n). In particular, faces 213(1), 213(2), and 213(3) are positioned and angled to intercept a corresponding one of the three beams A, B, or C, perpendicular to the direction of beam propagation in waveguide 107, and each focusing portion 109a is positioned to accept a beam deflected towards one of the outputs O(n) and focus the beam onto the end of the corresponding waveguide 111a. The application of a control voltage thus deflects the optical signal provided to optical input I in the direction of beam A, beam B, or beam C, which then exits module 100 through a corresponding one of the outputs O(n).

One example of a method of manufacturing the optical switch module of FIGS. 2 and 3 is now made with reference to FIGS. 2 and 3 and to FIGS. 9A to 9F, which illustrate a portion of input side waveguide portion 101, collimate portion 103, optical deflection portion 105, and a portion of waveguide 107. Optical switch modules of the present invention can be fabricated using processing steps that are well known in the field. See, for example, the Kato patent and the Yoshimura patent. In the example that follows, the thicknesses of the optical layer are selected to provide a waveguide, as is known in the art, while the thicknesses of metallic layers are selected to have electrical properties necessary for rapidly changing the applied voltages for switching optical signals.

Figure 9A:
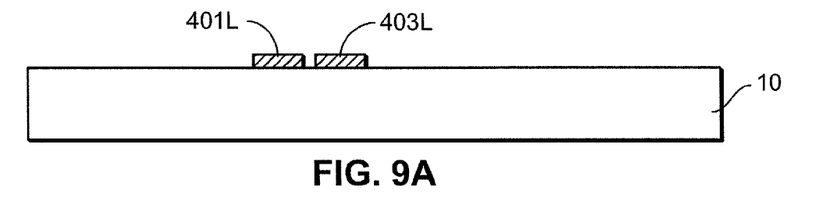
FIGS. 9A to 9F are sectional views showing a method of manufacturing the optical switch module according to first embodiment.
Figure 9B:
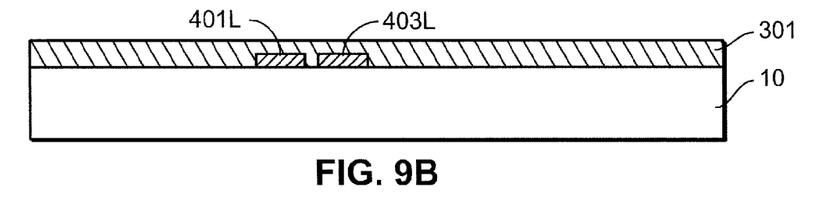

First, as shown in FIG. 9A and FIG. 3, a Au (gold) film is formed on a silicon substrate 10 by sputtering, and is then patterned to form lower electrodes 207, including first and second lower electrode portions 401L and 403L, of optical deflecting element 105a. Next, as shown in FIG. 9B, a lower cladding layer 301 is formed on top of substrate 10 and lower electrodes 207. Layer 301 is an optical material having a desired a refractive index, and can be formed from an epoxy resin.

Figure 9C:
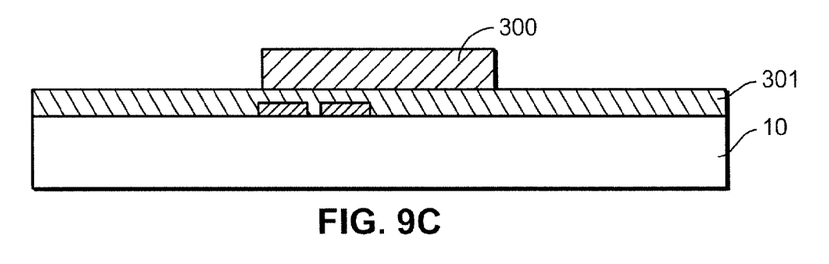
Figure 9D:
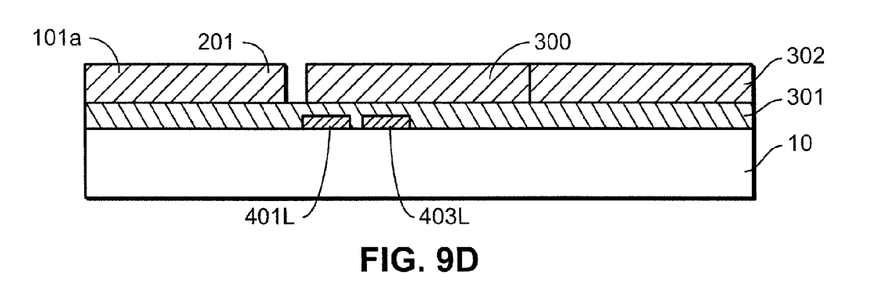
Figure 9E:
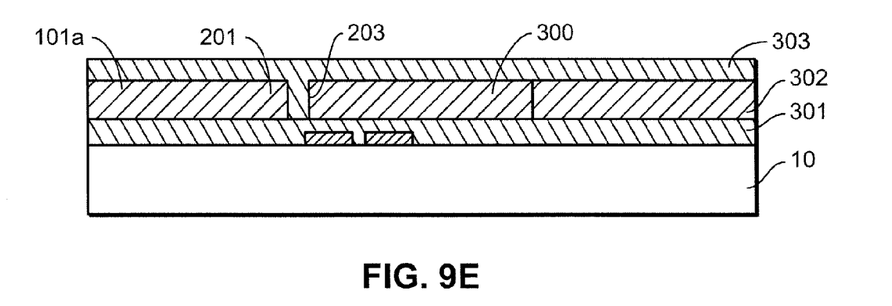

Then, as shown in FIG. 9C, an electro-optic thin film 300, for example an organic nonlinear optical material, is formed on lower cladding layer 301 to serve as the waveguide optical deflecting portion 105. As shown in FIG. 9D, a resin film with a refractive index higher than the lower cladding layer 301 is next deposited and patterned to form optical waveguides 101a and 111a, optical waveguides 302, and two-dimensional elements 201 and 217. The waveguide fabrication is completed, as shown in FIG. 9E, by forming an upper cladding layer 303 using the same resin as the lower cladding layer 301, which also covers the sides of channel waveguides 101a and 111a as side cladding 101b and 111b, as well as the clearances of the high refractive index resin in the collimate portion 103 and the focusing portion 109 (portions 203 and 215 in FIG. 3).

Figure 9F:
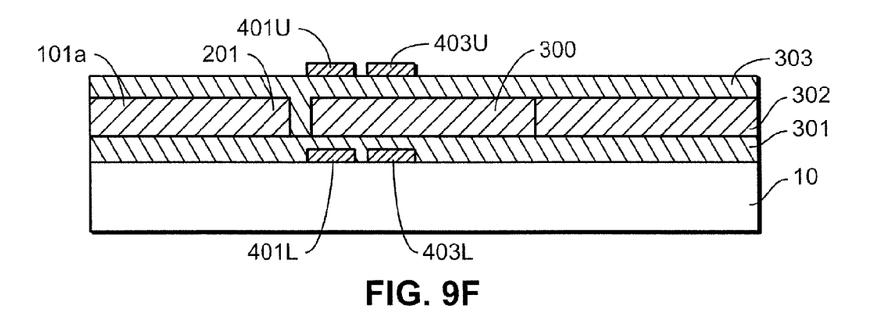

Lastly, as shown in FIGS. 9F and 2, upper electrode 208 is formed on the upper cladding layer 303. The first upper electrode portion 401U is connected to same signal lines as the second lower electrode portion 403L, and the second upper electrode portion 403U is connected commonly with first lower electrode portion 401L to ground.

Figure 7:
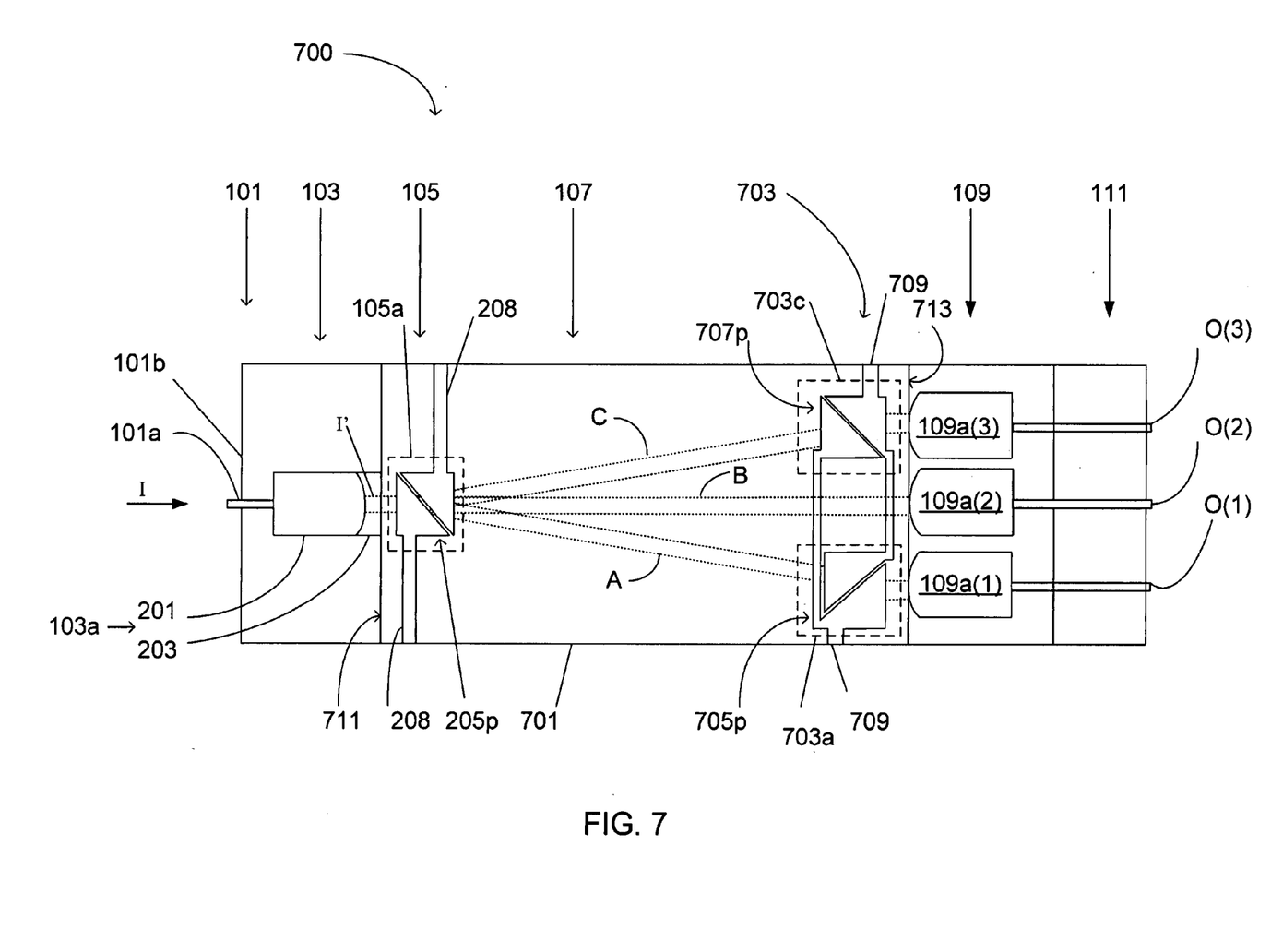
FIG. 7 is a schematic top view of a second embodiment of the 1×N optical switching module of the present invention.

An alternative embodiment switch is now presented with reference to FIG. 7, which is a schematic top view of a second embodiment 700 of the 1×N optical switching module of the present invention for N=3 (a 1×3 optical switch). Module 700 includes the input side waveguide portion 101 and collimate portion 103 of the first embodiment, and a waveguide 701 of an EO material that extends from and input side 711 to an output side 713, and includes first optical deflecting portion 105, waveguide 107 and a second optical deflecting portion 703. Module 700 also includes a focusing portion 109 having 3 lens 109a and an output side waveguide portion 111. As described below, the deflections of optical deflecting portions 105 and 703 are coordinated by control system 110 to provide outputs O(n) that are parallel to beam I'. As in the first embodiment, the portions and waveguides 101, 103, 105, 107, 109, 111 include central portions that form waveguide cores and a lower layer 301 on substrate 10, and an upper layer 303 that together form waveguide cladding layers.

As shown in FIG. 7, output side 713 is flat and parallel to input side 711, and sides 711 and 713 are perpendicular to waveguide 101a, as are lenses 103a, 109a, and waveguide 111a. This in contrast to the first embodiment, in which face 213 is faceted, lenses 109a are angled, and waveguides 111a include curves as necessary to produce an array of parallel outputs.

Module 700 includes the second optical deflecting portion 703 to compensate for deflections in optical deflection module 105 and produce beams that are parallel to collimated beam I'. Specifically, optical deflection portion 703 includes optical deflecting elements 703a and 703c formed by electrodes 709 that are provide electrical signals in concert with electrodes 207 and 208. Electrodes 709 are in the path of deflected beams A and C, respectively. Since beam B is not deflected, there is no need for a compensating deflecting element in the path of beam B.

Optical deflecting elements 703a and 703c include prisms 705p and 707p, respectively, of an EO material of waveguide 701 and portions of electrodes 709, as described previously with reference to optical deflecting portion 105a. Since beams A and C have a fixed deflection required to cause them to be parallel to beam I', the voltages provided to electrodes 709 are fixed for each optical deflecting element 703a and 703c.

Figure 8:
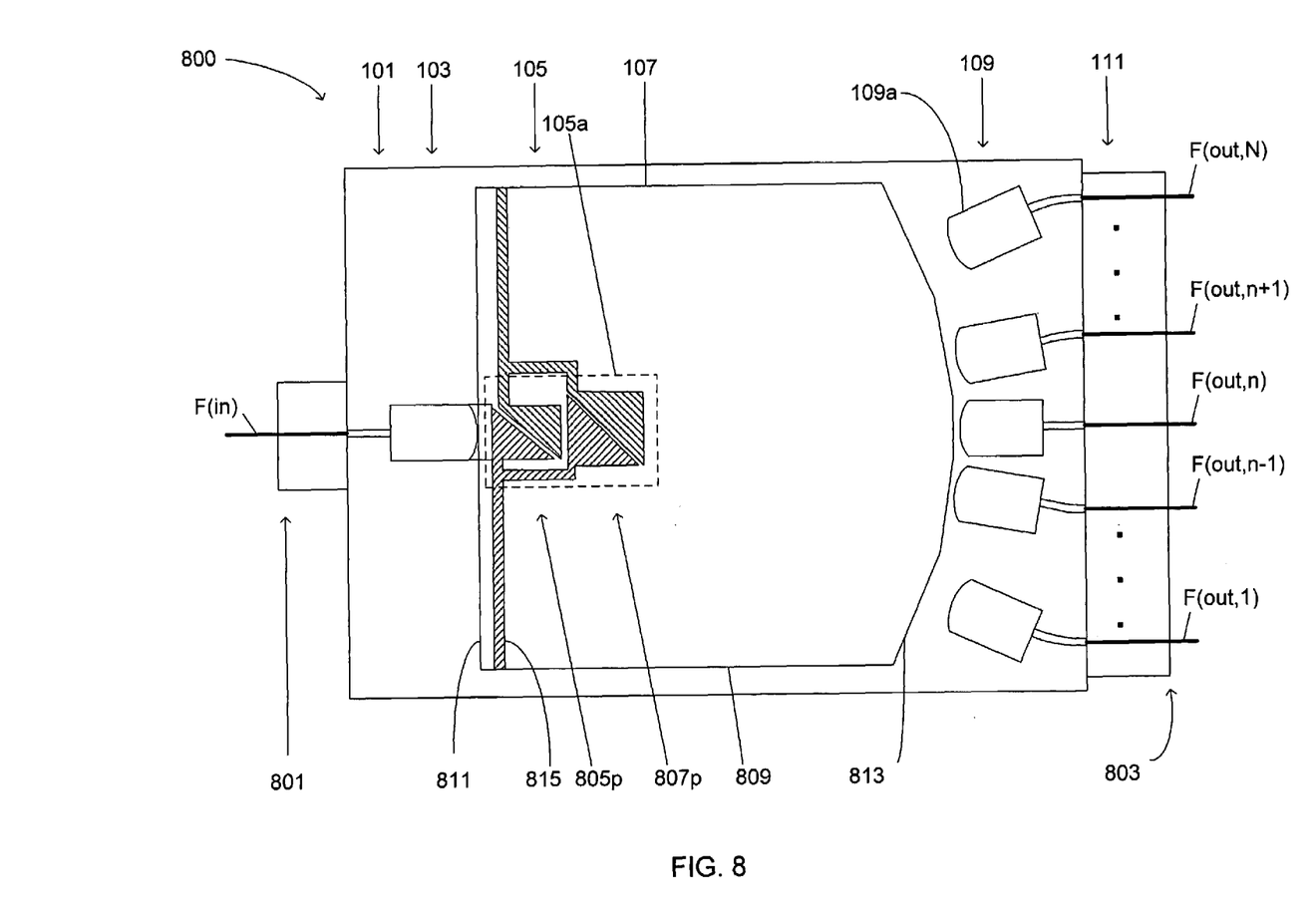
FIG. 8 is a schematic top view of a third embodiment of a 1×N optical switching module of the present invention.

FIG. 8 is a schematic top view of a third embodiment 800 of a 1×N optical switching module of the present invention. Module 800 has an input connector 801 to accept a input fiber F(in) to covey an input optical signal to the input side waveguide portion 101 and collimate portion 103 of the first embodiment, and a common waveguide 809 of an EO material that extends from and input side 811 to an output side 813, and includes optical deflecting portion 105. Module 800 also includes a focusing portion 109 having N lens 109a and an output side waveguide portion 111 and an output connector 803 adapted for attaching up to N fibers, F(out,1), . . . , F(out,N). As in the first embodiment, the portions and waveguides 101, 103, 105, 107, 109, 111 include central portions that form waveguide cores and a lower layer 301 on substrate 10, and an upper layer 303 that together form waveguide cladding layers.

As shown in FIG. 8, optical deflecting portion 105 includes optical deflecting element 105a formed of common waveguide 809 and upper and lower electrodes 815. Optical deflecting element 105a includes a first prism pair 805p and a second prism pair 807p including EO waveguide 809 and triangular shaped portions of electrodes 815. Each prism pair 805p, 807p is supplied with the same voltage, as discussed in the first embodiment, and thus a light beam passing through optical deflecting element 105a is deflected twice—first a first amount by prism pair 805p, and then by an additional amount by prism pair 807p. The operation of multiple prism pairs is discussed in more detail in U.S. Pat. No. 6,504,966.

Output side 813 is faceted to present a perpendicular face to each of the N beams that propagate across waveguide 809, as in the first embodiment. Each of the N beams is also aligned with the optical axis of one of the N lens 109a, which each provide light to a waveguide 111a that curves, if necessary, such that the N outputs are in a parallel array.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. For example, while the present invention describes the use of silicon to form the substrate, other materials including glass or ceramics may be used. In addition, the light deflecting elements can have other geometries for deflecting light, as is generally known in the art, produced using electro-optical materials as described herein. Optical switching modules including the light deflecting elements of the present invention can include such elements on some or all of the input channels, or on none or all of the output channels. Accordingly, the disclosures and descriptions herein are intended to be illustrative, but not limiting, of the scope of the invention, which is set forth in the following claims.

What is claimed is:

1. An optical switch module to switch an optical signal from an input fiber to a selected one of a plurality of output fibers comprising:
   a single optical input to accept an optical signal from the input fiber;
   optical elements to direct said optical signals to a selected one of a plurality of outputs each optically coupled to one of said plurality of output fibers, where said optical elements comprise:
   a collimating element to collimate said optical signal;
   an active deflecting element to accept said collimated optical signal and deflect said optical signal in a one of a plurality of directions corresponding to a one of said plurality of outputs, where said deflecting element comprises an electro-optic material and at least first and second pairs of electrodes on opposites sides of said electro-optic material;
   a common waveguide having a waveguide input to accept an optical signal deflected by said active deflecting element and a waveguide output, and a focusing element at sad plurality of output outputs comprising passive optics focus said optical signal from said common waveguide into said selected one of said plurality of outputs; and
   wherein said optical switch is a hybrid switch and wherein the material through which the optical path of said optical signal through said single optical input, said common waveguide, and said plurality of optical outputs differs from the electro-optical material of said active deflecting element.

2. An optical switch module to switch an optical signal from an input fiber to a selected one of a plurality of output fibers comprising:
   a single optical input to accept an optical signal from the input fiber;
   optical elements to direct said optical signals to a selected one of a plurality of outputs each optically coupled to one of said plurality of output fibers, where said optical elements comprise:
   a collimating element to collimate said optical signal;
   an active deflecting element to accept said collimated optical signal and deflect said optical signal in a one of a plurality of directions corresponding to a one of said plurality of outputs, where said deflecting element comprises an electro-optic material and at least first and second pairs of electrodes on opposites sides of said electro-optic material;
   a common waveguide having a waveguide input to accept an optical signal deflected by said active deflecting element and a waveguide output, and a focusing element at sad plurality of output outputs comprising passive optics focus said optical signal from said common wave guide into said selected one of said plurality of outputs; and
   wherein each of said passive optics includes a lens and an output waveguide, and wherein said passive optics have an optical axis perpendicular to said waveguide output and the input of said output waveguide.

3. An optical switch comprising:
   a single optical input for accepting an optical signal;
   an active deflecting element responsive to a control system to deflect said optical signal in a selected one of a plurality of directions, where said deflecting element comprises an electro-optical material and at least first and second pairs of electrodes on opposite sides of said electro-optical material;

a common waveguide to accept an optical signal deflected into any one of said plurality of directions;

a plurality of optical outputs, where each of said plurality of optical outputs corresponds to one of said plurality of dictions, and where each of said plurality of optical outputs comprises passive optics to accept said optical signal deflected in one of said plurality of directions and propagated through said common waveguide;

where said deflection of said optical signal to said selected one of said plurality of directions provides switching of said optical signal to a corresponding one of said plurality of optical outputs; and wherein each electrode of said at least first and second pairs of electrodes is of similar shape, and wherein the optical path of said optical signal passes between each of said electrodes.

4. The optical switch of claim 3 wherein at least some of said electrodes are gold.

5. The optical switch of claim 3 wherein said optical switch comprises a silicon substrate.

6. An optical switch module to switch an optical signal from an input fiber to a selected one of a plurality of output fibers comprising:

a single optical input to accept an optical signal from the input fiber;

optical elements to direct said optical signals to a selected one of a plurality of outputs each optically coupled to one of said plurality of output fibers, where said optical elements comprise:

a collimating element to collimate said optical signal;

an active deflecting element to accept said collimated optical signal and deflect said optical signal in a one of a plurality of directions corresponding to a one of said plurality of outputs, where said deflecting element comprises an electro-optic material and at least first and second pairs of electrodes on opposites sides of said electro-optic material;

a common waveguide having a waveguide input to accept an optical signal deflected by said active deflecting element and a waveguide output, and a focusing element at sad plurality of output outputs comprising passive optics focus said optical signal from said common waveguide into said selected one of said plurality of outputs; and wherein said common waveguide propagates said deflected optical signal in a corresponding one of a plurality of waveguide directions, wherein said common waveguide has a waveguide output adjacent said plurality of optical outputs, and where in said waveguide output is approximately perpendicular to said plurality of waveguide directions, such that said optical signal is not significantly refracted when exiting said common waveguide.

7. An optical switch comprising:

a single optical input for accepting an optical signal;

an active deflecting element responsive to a control system to deflect said optical signal in a selected one of a plurality of directions, where said deflecting element comprises an electro-optical material and at least first and second pairs of electrodes on opposite sides of said electro-optical material;

a common waveguide to accept an optical signal deflected into any one of said plurality of directions;

a plurality of optical outputs, where each of said plurality of optical outputs corresponds to one of said plurality of dictions, and where each of said plurality of optical outputs comprises passive optics to accept said optical signal deflected in one of said plurality of directions and propagated through said common waveguide;

where said deflection of said optical signal to said selected one of said plurality of directions provides switching of said optical signal to a corresponding one of said plurality of optical outputs; and wherein said common waveguide has a face having a plurality of facets each adjacent to one of said plurality of optical outputs and perpendicular to said corresponding one of said plurality of directions.

8. The optical switch of claim 7 wherein said optical switch comprises a silicon substrate.

9. An optical switch comprising:

a single optical input for accepting an optical signal;

an active deflecting element responsive to a control system to deflect said optical signal in a selected one of a plurality of directions, where said deflecting element comprises an electro-optical material and at least first and second pairs of electrodes on opposite sides of said electro-optical material;

a common waveguide to accept an optical signal deflected into any one of said plurality of directions;

a plurality of optical outputs, where each of said plurality of optical outputs corresponds to one of said plurality of dictions, and where each of said plurality of optical outputs comprises passive optics to accept said optical signal deflected in one of said plurality of directions and propagated through said common waveguide;

where said deflection of said optical signal to said selected one of said plurality of directions provides switching of said optical signal to a corresponding one of said plurality of optical outputs; and wherein each of said passive optics includes a lens and an output waveguide, and wherein said passive optics have an optical axis perpendicular to said waveguide output and the input of said output waveguide.

10. The optical switch of claim 9 wherein said optical switch comprises a silicon substrate.

11. An optical switch comprising:

a single optical input for accepting an optical signal;

an active deflecting element responsive to a control system to deflect said optical signal in a selected one of a plurality of directions, where said deflecting element comprises an electro-optical material and at least first and second pairs of electrodes on opposite sides of said electro-optical material;

a common waveguide to accept an optical signal deflected into any one of said plurality of directions;

a plurality of optical outputs, where each of said plurality of optical outputs corresponds to one of said plurality of dictions, and where each of said plurality of optical outputs comprises passive optics to accept said optical signal deflected in one of said plurality of directions and propagated through said common waveguide;

where said deflection of said optical signal to said selected one of said plurality of directions provides switching of said optical signal to a corresponding one of said plurality of optical outputs; and wherein said optical switch is a hybrid switch and wherein the material through which the optical path of said optical signal through said single optical input, said common waveguide, and said plurality of optical outputs differs from the electro-optical material of said active deflecting element.

12. The optical switch of claim 11 wherein said optical switch comprises a silicon substrate.

13. An optical switch module to switch an optical signal from an input fiber to a selected one of a plurality of output fibers comprising:
a single optical input to accept an optical signal from the input fiber;
optical elements to direct said optical signals to a selected one of a plurality of outputs each optically coupled to one of said plurality of output fibers, where said optical elements comprise:
a collimating element to collimate said optical signal;
an active deflecting element to accept said collimated optical signal and deflect said optical signal in a one of a plurality of directions corresponding to a one of said plurality of outputs, where said deflecting element comprises an electro-optic material and at least first and second pairs of electrodes on opposites sides of said electro-optic material;
a common waveguide having a waveguide input to accept an optical signal deflected by said active deflecting element and a waveguide output, and a focusing element at sad plurality of output outputs comprising passive optics focus said optical signal from said common waveguide into said selected one of said plurality of outputs; and
wherein said common waveguide has a face having a plurality of facets each adjacent to one of said plurality of optical outputs and perpendicular to said corresponding one of said plurality of directions.

14. An optical switch module to switch an optical signal from an input fiber to a selected one of a plurality of output fibers comprising:
a single optical input to accept an optical signal from the input fiber;
optical elements to direct said optical signals to a selected one of a plurality of outputs each optically coupled to one of said plurality of output fibers, where said optical elements comprise:
a collimating element to collimate said optical signal;
an active deflecting element to accept said collimated optical signal and deflect said optical signal in a one of a plurality of directions corresponding to a one of said plurality of outputs, where said deflecting element comprises an electro-optic material and at least first and second pairs of electrodes on opposites sides of said electro-optic material;
a common waveguide having a waveguide input to accept an optical signal deflected by said active deflecting element and a waveguide output, and a focusing element at sad plurality of output outputs comprising passive optics focus said optical signal from said common waveguide into said selected one of said plurality of outputs; and
wherein each electrode of said first and second pairs of electrodes is of similar shape and wherein the optical path of said optical signal passes between each of said electrodes.

15. An optical switch comprising:
a single optical input for accepting an optical signal;
an active deflecting element responsive to a control system to deflect said optical signal in a selected one of a plurality of directions, where said deflecting element comprises an electro-optical material and at least first and second pairs of electrodes on opposite sides of said electro-optical material;
a common waveguide to accept an optical signal deflected into any one of said plurality of directions;
a plurality of optical outputs, where each of said plurality of optical outputs corresponds to one of said plurality of dictions, and where each of said plurality of optical outputs comprises passive optics to accept said optical signal deflected in one of said plurality of directions and propagated through said common waveguide;
where said deflection of said optical signal to said selected one of said plurality of directions provides switching of said optical signal to a corresponding one of said plurality of optical outputs; and
wherein said common waveguide propagates said deflected optical signal in a corresponding one of a plurality of waveguide directions, wherein said common waveguide has a waveguide output adjacent said plurality of optical outputs, and where in said waveguide output is approximately perpendicular to said plurality of waveguide directions, such that said optical signal is not significantly refracted when exiting said common waveguide.

16. The optical switch of claim 15 wherein said optical switch comprises a silicon substrate.

* * * * *